United States Patent
Huber

(10) Patent No.: US 10,370,195 B2
(45) Date of Patent: Aug. 6, 2019

(54) METHOD FOR OPERATING A LONG STATOR LINEAR MOTOR

(71) Applicant: B&R INDUSTRIAL AUTOMATION GMBH, Eggelsberg (AT)

(72) Inventor: Stefan Huber, Salzburg (AT)

(73) Assignee: B&R INDUSTRIAL AUTOMATION GMBH, Eggelsberg (AT)

( * ) Notice: Subject to any disclaimer, the term of this patent is extended or adjusted under 35 U.S.C. 154(b) by 0 days.

(21) Appl. No.: 15/944,368

(22) Filed: Apr. 3, 2018

(65) Prior Publication Data

US 2018/0282076 A1     Oct. 4, 2018

(30) Foreign Application Priority Data

Apr. 4, 2017   (AT) ............................. A 50263/2017

(51) Int. Cl.

| | |
|---|---|
| *B65G 43/08* | (2006.01) |
| *B65G 43/10* | (2006.01) |
| *H02K 41/03* | (2006.01) |
| *B65G 23/23* | (2006.01) |
| *G05B 19/418* | (2006.01) |

(52) U.S. Cl.
CPC ............ *B65G 43/10* (2013.01); *B65G 23/23* (2013.01); *B65G 43/08* (2013.01); *G05B 19/4189* (2013.01); *H02K 41/031* (2013.01); *B65G 2811/0673* (2013.01); *G05B 2219/45051* (2013.01); *Y02P 90/28* (2015.11)

(58) Field of Classification Search
CPC .... B65G 43/02; B65G 2203/02; B65G 43/08; B65G 43/10; B65G 23/18; H02P 25/064

USPC ................ 198/805; 104/292; 310/12, 13, 14
See application file for complete search history.

(56) References Cited

U.S. PATENT DOCUMENTS

| | | | |
|---|---|---|---|
| 3,908,113 A | 9/1975 | Maxham et al. | |
| 4,630,216 A | 12/1986 | Tyler et al. | |
| 6,101,952 A * | 8/2000 | Thornton | B60L 13/003 |
| | | | 104/130.02 |

(Continued)

FOREIGN PATENT DOCUMENTS

| | | |
|---|---|---|
| DE | 10 2004 048 515 | 4/2006 |
| DE | 10 2013 218 394 | 3/2015 |

(Continued)

OTHER PUBLICATIONS

Austria Office Action conducted in counterpart Austria Appln. No. 1A A50263/2017-1-2 (dated Aug. 25, 2017).

(Continued)

*Primary Examiner* — James R Bidwell
(74) *Attorney, Agent, or Firm* — Greenblum & Bernstein, P.L.C.

(57) ABSTRACT

To make it possible to operate a conveyor installation (1) in the form of a long stator linear motor in a simple manner, a first trigger point (Tx) is defined in at least one first position (Px) on the conveying track (2) and a first program code (Fx) which can be executed in the system controller (6) and with which a transport unit (TEn) is moved along a track section of the conveying track (2) in accordance with a defined movement profile is assigned to the first trigger point (Tx), and this program code (Fx) is executed for each transport unit (TEn) that reaches the first trigger point (Tx).

7 Claims, 3 Drawing Sheets

(56) References Cited

U.S. PATENT DOCUMENTS

| | | | |
|---|---|---|---|
| 6,876,107 B2* | 4/2005 | Jacobs | B60L 15/38 |
| | | | 310/12.19 |
| 8,616,134 B2* | 12/2013 | King | B60L 13/003 |
| | | | 104/284 |
| 8,996,161 B2 | 3/2015 | Wernersbach et al. | |
| 2012/0173065 A1* | 7/2012 | Hunter | A63G 3/02 |
| | | | 701/22 |
| 2013/0008336 A1 | 1/2013 | Young et al. | |
| 2016/0114983 A1 | 4/2016 | Vierbergen | |
| 2016/0207717 A1 | 7/2016 | Senn et al. | |
| 2016/0380562 A1 | 12/2016 | Weber et al. | |

FOREIGN PATENT DOCUMENTS

| | | |
|---|---|---|
| EP | 0 164 302 | 12/1985 |
| EP | 3015933 | 5/2016 |
| EP | 3 109 998 | 12/2016 |
| WO | 2012/170636 | 12/2012 |
| WO | 2013/103457 | 7/2013 |

OTHER PUBLICATIONS

Europe Office Action conducted in counterpart Europe Appln. No. 18 164 115.0 (dated Aug. 27, 2018) (w/ partial machine translation).

Austria Office Action conducted in counterpart Austria Appln. No. 1AA50263/2017-1-2 (dated Jul. 20, 2018) (w/ machine translation).

* cited by examiner

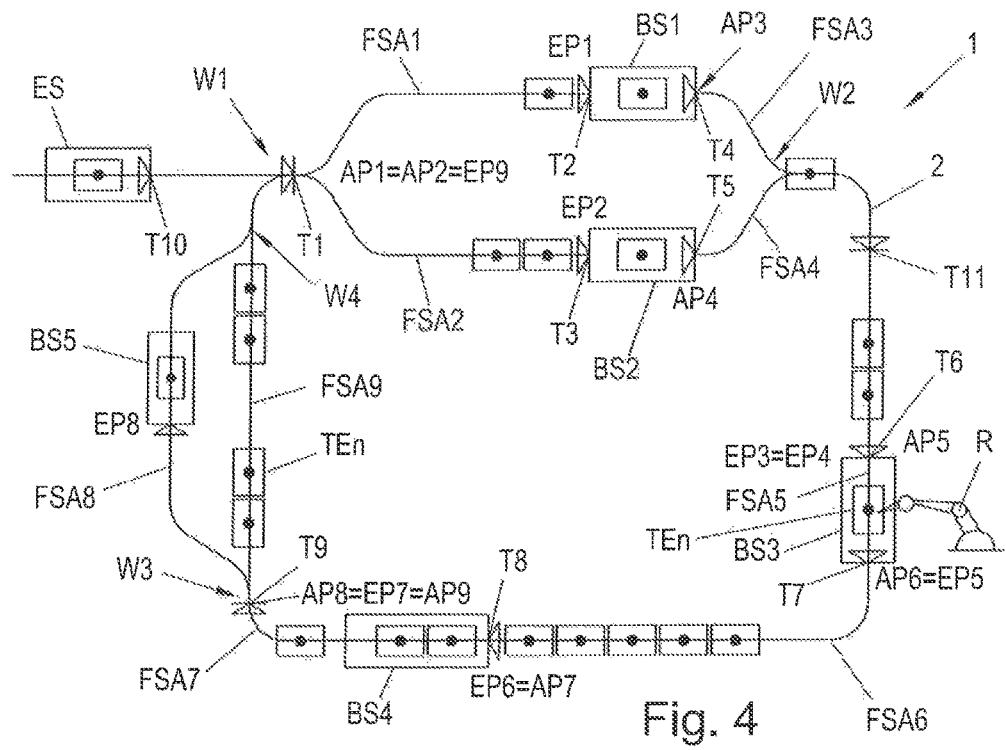
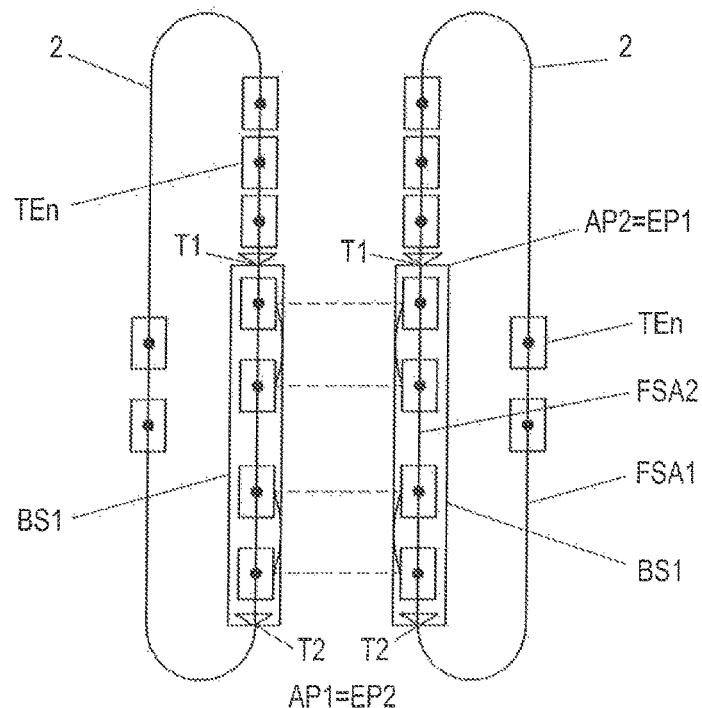

US 10,370,195 B2

METHOD FOR OPERATING A LONG STATOR LINEAR MOTOR

CROSS-REFERENCE TO RELATED APPLICATIONS

The present application claims priority under 35 U.S.C. § 119(a) of Austria Patent Application No. A50263/2017 filed Apr. 4, 2017, the disclosure of which is expressly incorporated by reference herein in its entirety.

BACKGROUND OF THE INVENTION

1. Field of the Invention

The subject matter of the invention relates to a method for operating a conveyor in the form of a long stator linear motor, wherein a plurality of transport units being moved along a conveying track of the conveyor by a system controller.

The invention relates to a conveyor in the form of a long stator linear motor in which a plurality of transport units is moved along a specified conveying track. For that, a plurality of stationary drive coils that form the stator of the long stator linear motor are arranged along the conveying track. The drive coils are energized, for example by applying an electrical voltage, in order to generate a moved magnetic field. The moved magnetic field interacts with drive magnets, generally permanent magnets or electromagnets, on a transport unit in order to move the transport unit in accordance with the motor principle. The drive coils can be individually and separately actuated by a controller. This makes it possible to also simultaneously move a plurality of transport units along the conveying track independently from one another. Conveyors of this type are well known, for example from U.S. Pat. No. 8,996,161 B2 or EP 3 109 998 A1.

2. Discussion of Background Information

U.S. Pat. No. 3,908,113 A, DE 10 2004 048 515 A1 and DE 10 2013 218 394 A1 also disclose linear motors for conveying applications. These documents additionally describe how a switch on the conveying track can be controlled in order to move a transport unit along different routes on the conveying track. The switch is either controlled by a unique identification of the transport unit and by using stored switching patterns, or on the basis of a status parameter of the transport unit.

The movement profile of a transport unit is normally planned in advance in order to determine how the transport unit is to be moved along the conveying track (e.g. position, speed, acceleration, route). In a conveyor in the form of a long stator linear motor, this can be very complex, since a large number of transport units are usually moving at the same time and the conveying track can have complex geometries, including having a plurality of track sections that can be interconnected by switches, for example.

For many applications and processes that use a conveyor in the form of a long stator linear motor to transport objects, it is however advantageous for a movement profile of a transport unit to not be precisely specified in advance, but instead when the movement profile can be changed at certain points in time or on the basis of certain criteria at running time, i.e. during the operation of the conveyor. For example, US 2016/0207717 A1 describes an approach of this type. In this document, a conveyor in the form of a long stator linear motor is described in which a movement profile of a transport unit can be adapted on the basis of the status of the transported object or on the basis of the status of a processing station for processing the transported object. The movement profile can be changed both in terms of the kinematics (e.g. by changing the speed) and also in terms of the route (e.g. by setting a switch). The decision as to which movement profile is used is made at predetermined points along the conveying track. This decision has to be made for each individual transport unit, which is very time-consuming for the control and regulation of the movement of the transport unit.

In conventional long stator linear motors, a number of functional blocks in the form of program code are assigned to each transport unit, by means of which blocks the necessary functions of the transport unit can be executed. During operation of the long stator linear motor, the necessary functional blocks are then executed. For example, there is a functional block by means of which a linear movement of the transport unit is executed, or there is a functional block by means of which the transport unit is synchronized to an external movement (e.g. that of a robot). These functional blocks are provided on the long stator linear motor for each transport unit, i.e. essentially, the same program code needs to be provided multiple times. Functional blocks are also initialized for a transport unit that are potentially not required at all during operation of the transport unit. If a new transport unit is added, the program code for the functional blocks also has to be duplicated. This of course requires a large memory. Apart from this, it is barely even possible to change a function during operation, because that would require intervention in a large number of program codes.

SUMMARY OF THE EMBODIMENTS

Therefore, embodiments of the present invention provide a method by which the operation of a long stator linear motor comprising a large number of transport units can be simplified.

This problem is solved according to the invention by a first trigger point being defined in at least a first position on the conveying track and a first program code which can be executed in the system controller and with which a transport unit is moved along a track section of the conveying track in accordance with a defined movement profile being assigned to the first trigger point, and by this program code being executed for each transport unit that reaches the first trigger point. Therefore, only a single program code is required to implement the movement of all the transport units from the trigger point. The program code is executed multiple times in succession for different transport units if necessary. Therefore, the need for memory for the software required to operate the conveyor installation can be considerably reduced. Furthermore, this makes it possible to easily change the functionality for all the transport units, since only one single piece of program code needs to be changed for this purpose, and this may even be possible during operation of the conveyor installation in some circumstances.

In an advantageous enhancement, specific data regarding the transport unit that is reaching the first trigger point are checked by means of a condition defined in the first executable program code, and, depending on the outcome of the check, the further movement of the transport unit along the conveying track is defined. This can increase the flexibility of the functionality of the conveyor installation. This can preferably be implemented by a memory region being allocated to each transport unit and specific data relating to the associated transport unit being stored in this memory region, which can then be read out and checked by means of a defined condition. This memory region is advantageously allocated when initializing the conveyor installation, whereby the memory region may remain allocated and there is no need change the allocation.

In an advantageous development, a second trigger point is defined in at least one second position on the conveying track and a second executable piece of program code that implements additional functionality of the conveyor is assigned to the second trigger point, this second piece of program code being executed for each transport unit that reaches the second trigger point.

Other exemplary embodiments and advantages of the present invention may be ascertained by reviewing the present disclosure and the accompanying drawing.

BRIEF DESCRIPTION OF THE DRAWINGS

The subject matter of the invention is explained in greater detail in the following with reference to FIG. 1 to 5, which show advantageous embodiments of the invention in an exemplary, schematic and non-limiting manner. In the drawings:

FIGS. 4 and 5 show additional examples of a conveying track comprising defined trigger points.

DETAILED DESCRIPTION OF THE EMBODIMENTS

Figure 1:
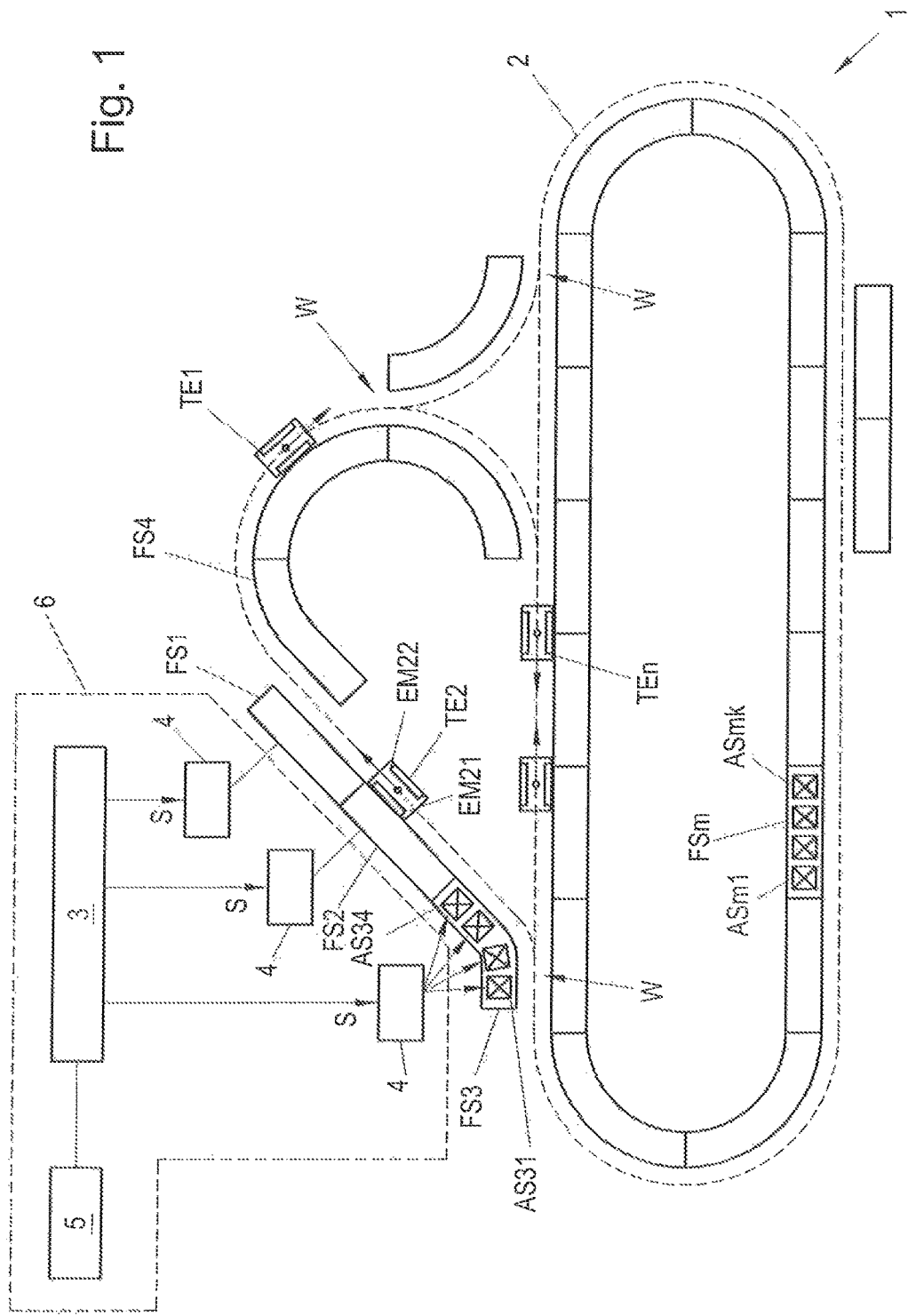
FIG. 1 shows a possible configuration of a conveyor comprising a conveying track.

The invention relates to a conveyor installation 1 in the form of a long stator linear motor in which a plurality of transport units TEn (n≥1 is an index that represents all the transport units TE1, TE2, etc.) are moved along a conveying track 2 of the conveyor installation 1. FIG. 1 shows, by way of example, an arbitrary construction of a conveyor installation 1 comprising a conveying track 2 (indicated by the dashed line). The conveyor installation 1 is designed as a long stator linear motor and a plurality of transport units TEn are provided which can be moved along the conveying track 2. The conveying track 2 is substantially defined by the long stator of the long stator linear motor 1. In the embodiment shown, a number of conveying segments FSm (m≥1 is an index that represents all the transport segments FS1, FS2, etc.) are provided that define the pathway for the transport units TEn, i.e. the conveying track 2. A conveying segment FSm forms a part of the long stator of the long stator linear motor. The conveying segments FSm are arranged so as to be stationary in a suitable construction, for example on a suitable supporting construction, and generally also form guide elements by means of which the transport units TEn can be retained and guided on the conveying track 2. Individual conveying segments FSm, such as FS1 and FS4 in FIG. 1, can be arranged on different sides (when viewed in the movement direction of the transport unit TEn) of the conveying track 2 and can also overlap in part in the movement direction, in particular at points on the conveying track 2 at which a transition from one track section to another track section takes place. It may also be provided that conveying segments FSm are arranged in sections on either side of the conveying track 2, as also shown in FIG. 1. Switches W may also be provided in order to carry out transitions between different track sections. It is understandable that an almost arbitrarily constructed conveying track 2 can be formed which does not only have to be in a two-dimensional plane, but can also extend three-dimensionally.

Each conveying segment FSm includes a number k≥1 of drive coils ASmk, the number k not having to be the same in every conveying segment FSm. For the sake of simplicity, FIG. 1 only shows drive coils ASmk of some conveying segments FSm. Each transport unit TEn includes a number l≥1 of drive magnets EMnl, preferably on either side (based on the movement direction, indicated by the arrows on the transport units TEn) of the transport unit TEn. During operation of the conveyor 1, the drive coils ASmk interact in a known manner with the drive magnets EMnl of the transport units TEn in accordance with the motor principle. If the drive coils ASmk are energized with a coil current in the region of a transport unit TEn, a magnetic flux develops that exerts a force on the transport unit TEn in cooperation with the drive magnets EMnl. Depending on the coil current, this force can comprise a propulsive-force-forming force component and a lateral-force-forming force component. The propulsive-force-forming force component essentially serves to move the transport unit TEn in the movement direction and the lateral-force-forming force component can for example be used to determine the pathway of the transport unit TEn in a switch W. By accordingly controlling the energizing of the drive coils ASmk, a moved magnetic field is generated in order to move the transport unit TEn along the conveying track 2. In this way, each transport unit TEn can be moved individually and independently along the conveying track 2 by the drive coils ASmk being energized by a corresponding coil current in accordance with the desired movement profile (position, speed, acceleration, route) in the region of each transport unit TEn.

This basic functionality of a long stator linear motor is well known, and therefore it will not be discussed in greater detail. For the subject matter of the invention, the specific structural design of the transport units TEn, the conveying segments FSm, the drive coils ASmk, the drive magnets EMnl, etc., is also irrelevant, and therefore it will also not be discussed in greater detail.

In order to control the movement of the individual transport units TEn, a transport unit controller 3 is provided in which the setpoint values S for the movement of the transport units TEn, generally positions $p_n$, or equally also speeds $v_n$ or propulsive forces $F_{V_n}$, are generated. Of course, a plurality of transport unit controllers 3 may equally also be provided, which are each allocated to a part of the conveyor installation 1, e.g. to a track section made up of a plurality of conveying segments FSm, and control the movement of the transport units TEn in this part of the track. In addition, segment control units 4 may also be provided, which are assigned to a number of drive coils ASmk, for example to the drive coils ASmk of a conveying segment FSm (or even a plurality of conveying segments FSm or a part of a conveying segment FSm), and which convert the setpoint value settings for the associated transport unit controller 3 for a transport unit TEn into controlled variables, for example into coil currents or coil voltages, for the drive coils ASmk of the conveying segment FSm. The segment control units 4 could, however, also be implemented in a transport unit controller 3. A suitable controller that converts the setpoint value setting based on the setpoint values S into a suitable controlled variable for the drive, for example into a coil current or a coil voltage, is accordingly implemented in a segment control unit 4.

The desired path of the transport units TEn along the conveying track 2 can also be predetermined by a superordinate conveyor controller 5, in which, for example, a route calculation (which path a transport unit TEn should take), switch arbitration (which transport unit TEn can proceed into switch W), deadlock prevention (e.g. if two transport units TEn obstruct each other), etc., can be carried out in order to move the transport units TEn along the conveying track 2 in a desired manner, e.g. in order to carry out a manufacturing process, an assembly process, or another process. These movement settings for the transport units TEn can be converted into setpoint value settings for the transport units TEn in the transport unit controller 3.

The conveyor controller 5, the transport unit controller 3 and the segment control unit 4 (if these are provided) can of course be designed to be separate (for example different pieces of hardware and software), but of course can also be integrated in any way (sometimes, the same hardware runs the corresponding software). Therefore, only a system controller 6 is mentioned in the following.

The movement of the transport units TEn along the conveying track 2 is planned in advance at least in portions, i.e. a movement profile is determined for this portion. For example, there may be track sections of the conveyor installation 1 in which manufacturing processes, handling processes, assembly processes and the like are carried out on an object transported by a transport unit TEn. For this purpose, the transport unit TEn has to be moved in this track section in a predetermined movement profile (e.g. position p, speed v, acceleration a). There may also be track sections in which a transport unit TEn needs to be moved as rapidly as possible, or has to wait for other transport units TEn, or has to be synchronized with another transport unit or with an external movement. Of course, many more other settings are conceivable for a movement profile. In addition, a certain position on the conveying track 2, in particular on complex conveying tracks 2 having many track sections and switches W, can often also be achieved in various ways, and this also needs to be planned.

Figure 2:
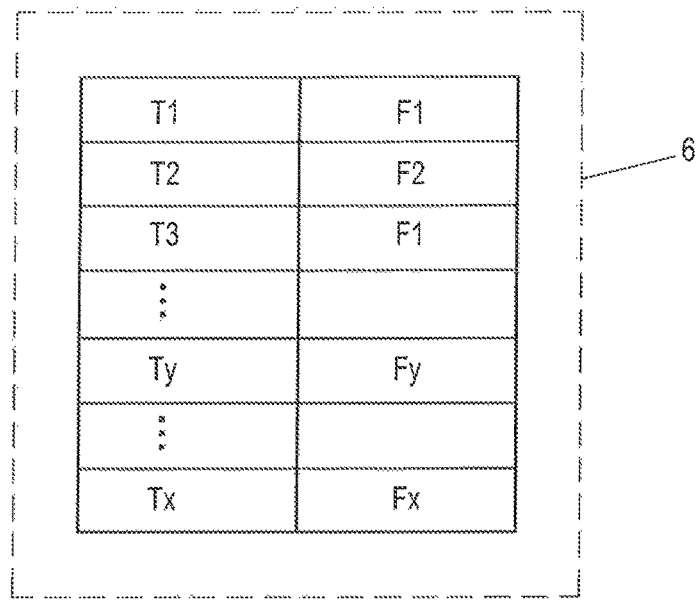
FIG. 2 shows the assignment of trigger points to executable program codes.

In order to operate the conveyor installation 1 in the form of a long stator linear motor in a simple manner, a number x≥1 of trigger points Tx are defined along the conveying track 2 at defined positions Px. A functional block in the form of an executable piece of program code Fx is assigned to a trigger point Tx, as shown in FIG. 2. The program code Fx is implemented in the system controller 6 and can be executed therein. Of course, it is also conceivable for the executable program code Fx to be assigned to a plurality of trigger points Tx, such as in FIG. 2, in which the program code F1 is allocated to the trigger points T1 and T3. The assigned program code Fx is executed when a transport unit Tn passes the trigger point Tx. This means that the same program code Fx is executed for each transport unit Tn that passes this trigger point Tx. However, this also means that a piece of program code Fx is independent of the transport units TEn. Therefore, the program code for carrying out a certain function of the conveyor installation 1 only needs to be available once, since the same program code Fx is used for all the transport units TEn passing the trigger point Tx. Therefore, savings can be made in terms of memory for program code, since it is no longer necessary to store the same program code multiple times. In addition, it is thus possible in a simple manner to change some functionality of the conveyor installation 1 centrally for all the transport units TEn, since only a single piece of program code Fx needs to be changed for this purpose. The program code Fx assigned to a trigger point Tx is thus also independent of the transport units TEn. At the same time, however, this of course also means that the program code Fx may have to be executed multiple times in succession for various transport units Tn, which requires more processing power in some circumstances. The processing power required for this purpose is undoubtedly available with currently available hardware, however.

The function of the conveyor installation 1 is planned in advance at least along a predetermined track section, preferably along the entire conveying track 2, by means of the trigger points Tx and by means of the associated program codes Fx. This means that each piece of program code Fx for each trigger point Tx on the track section has to be created and stored in advance. Here, ready-made program codes Fx can of course be used, which are stored in a program-code library, for example, and/or program code Fx can also be written in an application-related manner. In this case, a piece of program code Fx can of course likewise again be compiled from various, preferably provided, software modules, in order to simplify programming. The required program codes Fx are then stored in the system controller 6 in an executable manner and are assigned to the trigger points Tx. In addition to the program codes Fx for the trigger points, other software is of course also implemented in the system controller 6 that is executed in parallel with the program codes Fx.

Figure 3:
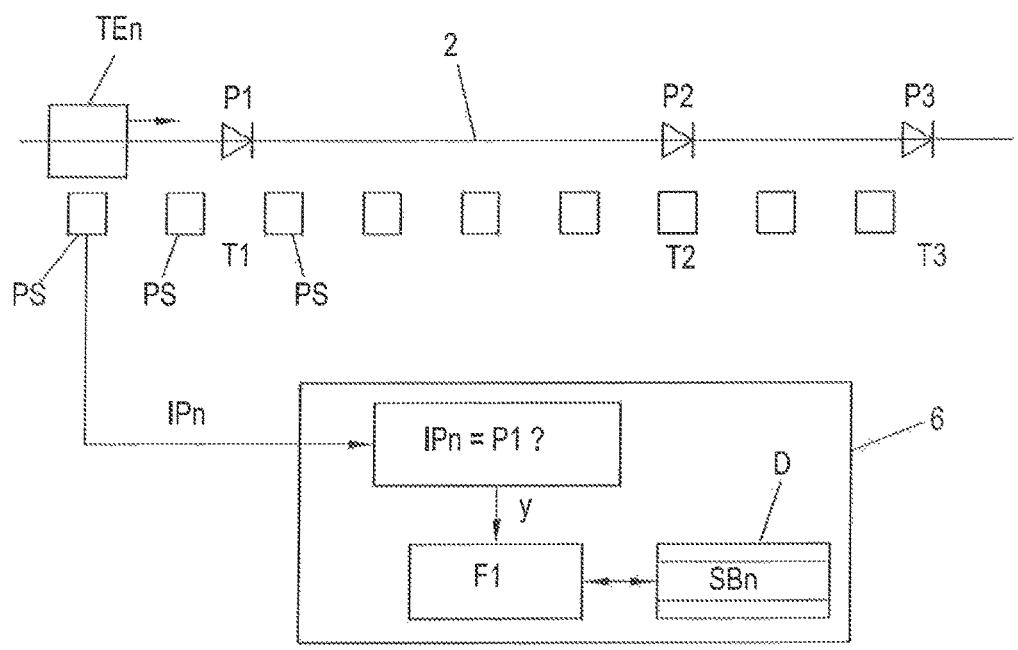
FIG. 3 shows an example of a conveying track comprising defined trigger points.

The actual positions IPn of the transport units TEn are known in the system controller 6. For this purpose, suitable and well-known position sensors PS are usually provided in the conveyor installation 1, that is to say along the conveying track 2, by means of which sensors the current actual positions IPn of the transport units TEn can be detected. Since the positions Px of the trigger points Tx along the conveying track 2 have been defined in advance and thus are known in the system controller 6, the system controller 6 can easily determine, using simple position comparison, whether a transport unit TEn has passed a trigger point Tx, as shown in FIG. 3 by a simple conveying track 2 comprising three trigger points T1, T2, T3. By doing so, as a triggering event, it can be checked whether a transport unit TEn travels over a trigger point TX, or whether a transport unit TEn is within a certain predetermined region around a trigger point Tx. In order to determine whether a transport unit TEn has passed a trigger point Tx, in an approximation the setpoint positions of the transport units TEn, which are generally available in the system controller 6, could also be used instead of the actual positions IPn, however. Since the movement of the transport unit TEn is controlled in the system controller 6 (substantially by setting the setpoint positions and/or setpoint speeds in accordance with the movement to be carried out), the system controller 6 also knows which transport unit TEn has passed a trigger point Tx.

In FIG. 3, a transport unit TEn is moved in the movement direction (indicated by an arrow) along a conveying track 2. The actual position IPn of the transport unit TEn is detected in the system controller 6 and position comparison is carried out to monitor whether a trigger point Tx at the position P1 has been passed. If the transport unit TEn reaches the trigger point T1 at the position P1, the program code F1 assigned to this trigger point T1 is executed for the transport unit TE1. If the transport unit TE1 continues moving, it reaches the next trigger point T2 at the position P2 at some point, at which point the program code F2 assigned to this trigger point 12 is executed for the transport unit TE1, etc. In the meantime, another transport unit TEn can of course pass the trigger point T1 again.

In a track section of the conveying track 2 in which the conveyor 1 is operated on the basis of this principle, at least one trigger point Tx is available at a position Px at which a piece of program code Fx is executed by means of which a movement of a transport unit TEn is controlled along a track section of the conveying track 2 in accordance with a desired movement profile. A piece of program code Fx of this type for the movement of a transport unit TEn can for example carry out a linear movement of the transport unit TEn, i.e. for example a movement having a constant speed towards a predetermined target position. Of course, other movement profiles on the track section are also conceivable, for example the fastest possible arrival at a target position or the synchronization of a transport unit TEn with an external movement, e.g. of a tool of a robot, wherein the setpoint values for the movement being obtained from the external movement. Therefore, a movement profile is in principle a progression over time of a parameter of the movement, for example a speed profile or position profile over time.

Reasonably, the movement of a transport unit TEn is controlled by a piece of program code F1 from a first trigger point T1 to a subsequent trigger point T3. If the transport unit TEn reaches the subsequent trigger point T3, the assigned program code F3 is executed, which e.g. continues the movement of the transport unit TEn. In this way, the movement of the transport unit TEn can be controlled along the entire conveying track 2, or at least along a track section of the conveying track 2.

However, program codes are also conceivable that implement functionalities of the conveyor 1 other than carrying out a movement of a transport unit TEn. Advantageously, it may be provided that a trigger point Ty at which a piece of program code Fy is executed that implements this additional functionality is provided in at least one position Py on the conveying track 2. For example, at a trigger point T2 in FIG. 3, something could be displayed, for example visualized, on a display of the conveyor installation 1 by means of a piece of program code F2, or a counter could be updated with which the number of transport units TEn having a certain property (e.g. what it is transporting) is counted. There are almost no limits to this, and everything that can be implemented by programming can be realized.

The query for a condition can also be implemented in a piece of program code Fx, and this makes it possible to make the function to be carried out subject to a condition. In this way, a decision can for example be made which route a transport unit TEn will take at a switch, or said unit can be made to wait for a certain event to occur, e.g. for a processing station to become free. There are almost no limits to this, and everything that can be implemented by programming can be realized.

It is also possible for a trigger point Tx to be activated and deactivated. For example, the system controller 6 or the staff operating the conveyor installation 1 could activate or deactivate a certain trigger point Tx if necessary. For example, the trigger point T2 could be positioned at a switch and the system controller 6 could give the command to remove a certain transport unit TEn from the conveying track 2 via the switch. To do this, the trigger point T2 does not have to be permanently activated, but can just be activated as needed. In this context, it may also be provided that a first trigger point T1 activates or deactivates another trigger point Tx, for example depending on a condition being queried. For example, the onward movement route could be selected on the basis of a counter, e.g. one hundred transport units go to the left, then one hundred transport units go to the right.

In an advantageous embodiment of the invention, a memory region SBn of a data memory D, for example in the system controller 6, is assigned to each transport unit TEn in which data specific to the transport unit TEn being stored. In this case, "specific to the transport unit TEn" means in particular data relating to the status of the transport unit TEn, data relating to the transported object and/or data relating to the status of the transported object. The memory region SBn is for example allocated when initializing the conveyor installation 1, e.g. during start-up, and is not changed during operation of the conveyor 1. A memory region SBn is allocated to a newly added transport unit TEn. If a transport unit TEn is removed, the allocated memory region SBn is deallocated. In this way, it is also not necessary to assign a unique identifier to a transport unit TEn which would have to be stored on the transport unit TEn, since each transport unit TEn can be identified on the basis of the known actual position IPn (or target position SPn) of a transport unit TEn alone, and the necessary data can be read out of the memory region SBn or written to said region.

Although the memory region SBn could be located on the transport unit TEn itself, it is preferably provided in the system controller 6. The system controller 6 can manage the data memory itself and can allocated any memory region SBn, but one which is fixed following allocation, to each transport unit TEn. Outside the system controller 6 or the transport unit TEn, it is not necessary to know where this memory region SBn is located (i.e. for example at which memory address of which data memory of the system controller 6). It therefore also does not need to be provided for a transport unit TEn to be addressed via the memory region SBn (or the memory address thereof). Only a software function needs to be implemented, e.g. in the system controller 6, which can read out the memory region SBn assigned to a transport unit TEn, in particular at a trigger point Tx. In doing so the transport unit TEn, or the allocated memory region SBn, is addressed which happens to be located at the trigger point Tx.

Data relating to the status of the transport unit TEn may for example be the last maintenance data, the operating hours, the distance covered, etc. Data relating to the transported object may for example be the kind or type of object, a property of the object (e.g. color), whether an object is even present, etc. Data relating to the status of the transported object may for example be the fill level, the temperature, the weight, the processing state of the object, etc. This list is of course only given by way of example and is in no way exhaustive. Of course, a wide range of data can be stored depending on the conveyor 1 and the application.

These data for a transport unit TEn are of course continuously written to or updated in the allocated memory region SBn during operation of the conveyor installation 1. This could again be carried out at trigger points Tx by suitable program codes Fx, or functions in a program code. In this way, the content of the memory region SBn always represents the current status of the transport unit TEn. For example, in the example in FIG. 2, the distance covered by the transport unit TEn could be updated in the memory region SBn at a trigger point Tx.

At a trigger point Tx, a condition can therefore be implemented in the assigned program code Fx that is dependent on the data specific to the transport unit TEn in the allocated memory region SBn. This condition is checked by the program code Fx and, depending on the output of the check by the program code Fx, a corresponding action is carried out, for example the onward movement of the transport unit TEn. In this way, the movement of the transport unit TEn can be influenced by the movement profile, the type of control of the movement (e.g. external setpoint values), or also by the selected route of the transport unit TEn. The movement profile can for example be changed by the parameters of the movement, for example by setting a new permissible maximum speed or acceleration limit, by creating a new or adapted movement profile or any movement profile, etc. The type of control can for example be switched from setting a target position to coupling to an external movement, etc. The route of the transport unit TEn can for example be changed by setting a switch W.

The principle according to the invention is explained in the following on the basis of an embodiment of a conveyor installation 1 with reference to FIG. 4.

FIG. 4 shows a conveyor installation 1 comprising a conveying track 2, along which a plurality of transport units TEn are moved. The conveying track 2 also includes portions having a plurality of paths that can be reached via switches W. The conveying track 2 is divided into a number $p \geq 1$ of conveying track portions FSAp for planning the movement of the transport units TEn, but this is not strictly necessary. Each conveying track portion FSAp has a starting point APp and an end point EPp, as shown in FIG. 4 for some conveying track portions FSAp. A starting point APp or an end point EPp of different conveying track portions FSAp can of course also coincide. Individual conveying track portions FSAp can be connected by switches W. Likewise, conveying track portions FSAp can also partly coincide.

In FIG. 4, a first conveying track portion FSA1 is defined between the starting point AP1 and the end point EP1, by way of example. At the end point EP1, a processing station BS1 begins, in which any kind of processing operations are carried out on an object transported by a transport unit TEn. In this example, in the processing station BS1, the transport unit TEn is moved through the processing station BS1 itself, which is why a conveying track portion FSAp is not required in this region. At the end of the processing station BS1, another conveying track portion FSA3 begins at a starting point AP3 and ends at an end point EP3. In order to allow a higher throughput, a second processing station BS2 is provided in parallel with the first processing station BS1, and this route via the second processing station BS2 is formed by the conveying track portions FSA2, FSA4. In this configuration, the starting points AP1, AP2 of the conveying track portions FSA1, FSA2 coincide, and so do the end points EP3, EP4 of the conveying track portions FSA3, FSA4. The conveying track portions FSA1, FSA3 are interconnected by a switch W1 at the starting points AP1, AP2. The conveying track portions FSA3, FSA4 overlap in part from a switch W2 at which the conveying track portions FSA3, FSA4 are merged.

The transported object is for example processed in the processing station BS3 by means of a robot R, the processing being intended to be carried out during the movement of the transport unit TEn transporting the object. To do this, a conveying track portion FSA5 is defined for the processing station BS3 on which the movement of the transport unit TEn is synchronized with the external movement of the robot arm of the robot R. The movement profile is thus externally predetermined on this conveying track portion FSA5, i.e. the controller of the movement of the transport unit TEn on the conveying track portion FSA5 obtains the setpoint values from an external source, for example from the robot controller.

A movement profile for a transport unit TEn can be planned in advance on the conveying track portions FSAp. It should however be noted that different movement profiles may also be planned for different transport units TEn on a conveying track portion FSAp. A movement profile is for example defined as a speed profile over time or distance, with a starting speed and end speed, with accelerations (which of course also includes negative acceleration for braking) at different times or positions, with settings relating to the jerk (time derivative of the acceleration), etc. A setpoint value S from which a controlled variable (e.g. a coil voltage of one or more drive coils ASmk) to be set is then calculated can then be derived from the movement profile in each time increment of the control of the movement of the transport unit TEn. It is however also possible that just a target position (e.g. the end position EP1) is planned in advance and that the controller itself determines how this target position is reached, i.e. the controller itself creates a suitable movement profile.

The objects transported by the transport units TEn are for example inspected in a processing station BS4 on a conveying track portion FSA7. For this purpose, the transport unit TEn is moved through the processing station BS4 by means of the conveyor installation 1.

In order to implement the desired function along the conveying track 2, a number $x \geq 1$ of trigger points Tx are defined at different positions Px. Program codes Fx that implement the desired functions are assigned to said trigger points.

At the trigger point T1, the status of the conveying track portions FSA1, FSA2 can for example be queried using the assigned program code F1 together with a condition. For example, it may be queried as to how many transport units TEn are currently therein. A transport unit TEn that reaches the trigger point T1 is then guided to the conveying track portion FSA1, FSA2, in which there are fewer transport units TEn, by setting the switch W1. At the trigger point T1, however, a status of the transport unit TEn that reaches the trigger point T1 could itself be queried in a defined condition, for example which object (for example goods 1 or goods 2'?, or object present or no object present?, or object full or empty?, etc.) is being moved on the transport unit TEn. Depending on the result of the queried condition, the transport unit TEn could then be diverted to the correct conveying track portion FSA1, FSA2 in order for the processing to be carried out in the correct processing station BS1 or BS2.

At the trigger point T1, the following condition could for example be queried in the allocated program code F1:

If object on transport unit TEn is of type A, then route A via conveying track portion FSA1. The movement is carried out by means of the program code F1 with the movement profile defined therein with a target position of end point EP1. If object on transport unit TEn is not of type A, then route B via conveying track portion FSA2. The movement is carried out by means of the program code F2 with the movement profile defined therein with a target position of end point EP2.

A status of a processing station BS1, BS2 on the conveying track portions FSA3, FSA4 could equally be queried by a condition. If the processing station BS1 is inoperative, for example, then each transport unit TEn at the trigger point T1 is guided to the conveying track portion FSA2. The program code F1 also implements the movement of a transport unit TEn on the conveying track portion FSA1 or FSA2 in accordance with the predetermined movement profile, for example as far as the next trigger point T2, T3 at the relevant entry to the processing station BS1 BS2, which here also includes setting the switch W1. The transport unit TEn could for example be transferred to the relevant processing station BS1, BS2 by means of the assigned program code F2, F3 at the trigger points T2, T3.

Another trigger point T4, T5 is provided at the exit from the processing station BS1, BS2, at which point the transport unit TEn is moved as far as the next trigger point T6 by means of the allocated program code F4, F5. In this case, the same program code could be used for both trigger points T4, T5, because the same movement is carried out to the same target.

At the trigger point T6, the movement mode is changed by the program code F6, since the transport unit TEn is synchronized with an external movement at the conveying track portion FSA5. The movement mode is changed again at the trigger point T7 at the exit from the processing station BS3 and the transport unit TEn is moved to the entry of the processing station BS4. At the trigger point T8 located here, the movement of the transport unit TEn may be changed again, for example by a lower speed being implemented.

At the trigger point T9, the result of the inspection in the processing station BS4 may be queried. The status of a transport unit TEn could also be queried. In the event of an undesired status, i.e. if for example the inspection has identified a defective object or if the transport unit TEn has to undergo maintenance, for example because the transport unit TEn has reached a predetermined number of meters covered, said transport unit is diverted to the conveying track portion FSA8 at the switch W3 by the program code F9 of the trigger point T19.

At the trigger point T9, the following condition could for example be queried in the allocated program code F9:

If, for transport unit TEn, the distance covered<a predetermined value, then route A via conveying track portion FSA9. The movement is carried out by means of the program code F9 with the defined movement profile with a target position of end point EP9. If, for transport unit TEn, the distance covered≥a predetermined value, then route B via conveying track portion FSA8. The movement is carried out with the defined movement profile with a target position of end point EP8 to the maintenance station BS5. At the conveying track portion FSA8, however, a movement profile has not been planned in advance, for example. If a transport unit TEn is diverted onto this conveying track portion FSA8, then the system controller 6 creates a suitable movement profile, for example the fastest movement to a maintenance station BS5 while maintaining predetermined kinematic limits (e.g. maximum acceleration, jerk, etc.), and if necessary while avoiding collisions between transport units TEn.

If the transport unit TEn is removed from the conveyor installation 1 at the maintenance station BS5, the assigned memory region SBn is preferably deallocated.

A new transport unit TEn can be loaded into the conveyor installation 1 at a loading station ES. At the loading station ES, the memory region SBn for a new transport unit TEn is allocated, for example, and then the transport unit TEn is moved from the trigger point T10 to the trigger point T1 by means of the program code F10. In this case, the memory region SBn could also be allocated by the program code F10 at the trigger point T10.

Of course, other trigger points Tx along the conveying track 2 are also conceivable. Solely by way of example, the number of objects of a certain type that pass a trigger point T11 are counted at the trigger point T11 by means of an assigned piece of program code F11, and a display of the conveyor installation 1 is accordingly updated.

Another embodiment is explained with reference to FIG. 5. In this example, two separate conveying tracks 2 are arranged beside one another. The conveying tracks 2 each form a closed circuit, and two conveying track portions FSA1, FSA2 are defined on each path. The conveying track portion FSA1 is used to move the transport units TEn back from the exit of a processing station BS1 (starting point AP1, end point EP2) to the entry of the processing station BS1 (end point EP1, starting point AP2). At the entry to the processing station BS1 (end point EP1, starting point AP2), a trigger point T1 comprising a piece of program code F1 that queries the status of the processing station BS1 is defined in each case. If a fault occurs, or also if no transport unit TEn is available on the adjacent conveying track 2 at the moment, the transport unit TEn is stopped at the trigger point T1. Otherwise, the transport unit TEn moves into the processing station BS1. The synchronization of the movement (indicated by the dashed line) of the transport unit TEn with a transport unit TEn in the processing station BS1 of the adjacent conveying track 2 is defined on the conveying track portion FSA2 as the movement profile.

A trigger point T2 at which the movement mode of the transport unit TEn is switched is arranged at the exit from the processing station BS1. On the conveying track portion FSA1, the transport units TEn are intended to be moved as fast as possible to the entry of the processing station BS1 by means of the conveyor installation 1, for example as a movement profile, and this can be defined in advance by setting a target position (end point EP1) with maximum speed.

It would however also be conceivable for the movement from the exit from the processing station BS1 back to the entry of the processing station BS1 not to be carried out by the conveyor installation 1, but instead by another conveying means, for example a conveyor belt. At the trigger point T2, the transfer to the other conveying means could then be implemented by means of the program code T2, for example. In this case, the conveying track 2 would be reduced to the conveying track portion FSA2 in the processing station BS1.

For controlling the movement of a transport unit TEn, a program code Fx for example generates for a transport unit TEn the setpoint values for the movement (position and/or speed), in each time increment of the control, typically in the range of a few milliseconds, in accordance with the movement profile to be implemented. A piece of program code Fx can also read in the setpoint values from another source in each time increment of the control, for example in the case of synchronization of the movement with another movement, e.g. of a robot R. The setpoint value is then converted into corresponding controlled variables, for example coil voltages of the drive coils ASmk, in the system controller 6 in each time increment in accordance with the implemented control. If a piece of program code Fx is used several times, this code can of course be executed several times for different transport units TEn in a time increment of the control, which is possible using available hardware and processing power.

What is claimed:

1. A method for operating a conveyor installation in the form of a long stator linear motor, comprising:

moving, via a system controller, a plurality of transport units along a conveying track of the conveyor installation, defining a first trigger point in at least one first position on the conveying track; and assigning a first program code, which is executable in the system controller and with which a transport unit is moved along a track section of the conveying track in accordance with a defined movement profile, to the first trigger point;

executing the first program code for each transport unit that reaches the first trigger point, wherein a memory region allocated to each of the plurality of transport units stores specific data relating to each of the plurality of transport units, reading out the specific data for a transport unit located at the first trigger point; and checking a condition defined in the first program code; and based on the checked condition, defining further movement of the transport unit along the conveying track.

2. The method according to claim 1, further comprising:

moving the transport unit from the first trigger point to a subsequent trigger point using the first program code; and when the transport unit reaches the subsequent trigger point, executing an assigned program code for the subsequent trigger point to continue moving the transport unit along the track section of the conveying track.

3. The method according to claim 1, wherein the memory region comprises a unique memory region allocated to each of the plurality of transport units.

4. The method according to claim 1, further comprising:

defining a second trigger point in at least a second position on the conveying track;

assigning a second program code that implements additional functionality of the conveyor installation to the second trigger point, and executing the second program code for each transport unit that reaches the second trigger point.

5. The method according to claim 3, wherein the unique memory region is allocated to each of the plurality of transport units when initializing the conveyor installation.

6. The method according to claim 1, wherein at least one position sensor is arranged in a vicinity of the first trigger point to determine when the transport unit is located at the first trigger point.

7. The method according to claim 6, wherein a plurality of trigger points, which includes the first trigger point, is distributed over the conveying track and position sensors associated with the plurality of trigger points are distributed along the conveying track to determine at least one of: when the transport unit travels over an associated trigger point; when the transport unit is within a certain predetermined region around the associated trigger point, or when the transport unit passes the associated of trigger point.

* * * * *